United States Patent [19]

Landfors et al.

[11] Patent Number: 5,407,547
[45] Date of Patent: Apr. 18, 1995

[54] PROCESS FOR PRODUCTION OF ACIDIFIED PROCESS STREAMS

[75] Inventors: Johan Landfors; Roy Hammer-Olsen, both of Sundsvall, Sweden

[73] Assignee: Eka Nobel AB, Bohus, Sweden

[21] Appl. No.: 132,930

[22] Filed: Oct. 7, 1993

[30] Foreign Application Priority Data

Oct. 6, 1993 [SE] Sweden .................. 9303273

[51] Int. Cl.$^6$ .............................. B01D 61/44
[52] U.S. Cl. ................ 204/182.4; 204/182.5
[58] Field of Search ............. 204/95, 103, 182.4, 204/182.5

[56] References Cited

U.S. PATENT DOCUMENTS

| | | | |
|---|---|---|---|
| 3,884,777 | 5/1975 | Harke et al. | 204/84 |
| 4,081,520 | 3/1978 | Swindells et al. | 423/478 |
| 4,129,484 | 12/1978 | Larsson | 204/101 |
| 4,552,636 | 11/1985 | van den Brink et al. | 204/182.4 |
| 4,717,450 | 1/1988 | Shaw et al. | 162/29 |
| 4,806,215 | 2/1989 | Twardowski | 204/98 |
| 4,915,927 | 4/1990 | Lipsztajn et al. | 423/472 |
| 5,091,166 | 2/1992 | Engström et al. | 423/478 |
| 5,091,167 | 2/1992 | Engström et al. | 423/478 |

FOREIGN PATENT DOCUMENTS 2037522 9/1991 Canada .
0532188 3/1993 European Pat. Off. .
WO90/10733 9/1990 WIPO .
WO91/15613 10/1991 WIPO .
WO92/03374 3/1992 WIPO .

OTHER PUBLICATIONS

Jörissen et al, "The Behaviour of Ion Exchange Membranes in Electrolysis & Electrodialysis of Sodium Sulphate", Journal of Applied Electrochemistry, 21 (1991) 869–876 no month and no year given.

Baker et al, "Membrane Separation Systems", Recent Developments and Future Directions, Electrodialysis, Noyes Data Corporation, Park Ridge, N.J., pp. 396–451 (1991) no month and no year given.

Paleologou et al, "Bipolar Membrane Electrodialysis: A New Solution to the Problems of Chemical Imbalance in Kraft Mills", Pulp and Paper Research Institute of Canada, 78th Annual Meeting, Technical Section, CPPA, pp. A33–A37 no year and month given.

Primary Examiner—John Niebling
Assistant Examiner—Arun S. Phasge
Attorney, Agent, or Firm—Burns, Doane, Swecker & Mathis

[57] ABSTRACT

A process for producing chloric acid, which involves introducing a metal chlorate solution and an acid into separate compartments of an electrodialysis cell to produce a chloric acid solution.

17 Claims, 3 Drawing Sheets

Integrated chloric acid–alkali plant

Integrated chloric acid–chlorate plant

PROCESS FOR PRODUCTION OF ACIDIFIED PROCESS STREAMS

SUMMARY OF THE INVENTION

The present invention relates to the production of chloric acid. According to the invention a chloric acid containing solution such as an acidified solution of chlorate is produced by exchanging the metal ions, especially alkali metal ions, such as sodium or potassium ions, in the solution for hydrogen ions by introducing a metal chlorate stream and an acid to an electrodialysis stack to produce a pure chloric acid or an acidified chlorate containing solution and a solution of the metal salt of the introduced acid in two separate compartments of the stack. The produced chloric acid containing solution, such as acidified chlorate solution is preferably used in the production of chlorine dioxide. Furthermore, the produced metal salt can be converted to new acid, which is recycled to the electrodialysis stack, and metal hydroxide.

BACKGROUND TO THE INVENTION

Chloric acid and chlorine dioxide are commercially important chemicals. In the production of bleached pulp, chlorine dioxide has an important role as a powerful, cost effective and environmental-friendly bleaching agent. Chlorine dioxide is also used for water purification and for production of other chemicals like for example sodium chlorite. It is therefore desirable to have effective production processes for said chemicals with a minimum of by-products.

Chlorine dioxide is commonly produced by reacting a sodium chlorate solution together with an acid and a reducing agent.

In the "Solvay" and "Mathieson" processes chlorate is reduced to chlorine dioxide in an acidic medium with methanol and sulphur dioxide, respectively, as the reducing agents. A major draw back with these processes is the formation of chlorine as a by-product in the chlorine dioixde. This is most undesirable since chlorine gives higher levels of polychlorinated aromatic substances in the bleachery effluents. These processes also have a fairly low reaction rate and more recent technologies have shown greatly increased efficiencies.

Some chlorine dioxide processes are based on the use of hydrochloric acid as the acid medium. Thus, the chloride in the acid also serve as the reducing agent. The major drawback of such a process is the relatively high production of chlorine in the chlorine dioxide gas.

According to U.S. Pat. No. 4,081,520 an effective production can be performed at high acidities and reduced pressure in a single vessel reactor when using methanol as the reducing agent. This is a widely used process with good reliability. However, due to the high acidity in the reactor, the sulphate salt that is precipitated and withdrawn from the reactor is an acid salt in the from of sesquisulphate ($Na_3H(SO_4)_2$). This salt has to be neutralized with caustic which gives additional costs for chemicals.

The drawback of acidic sulphate can be overcome by using hydrogen peroxide as the reducing agent, see U.S. Pat. No. 5,091,166 and 5,091,167. A high production rate can be maintained even at low acidities wich makes it possible to obtain a neutral salt cake.

Later technology has been focusing on the possibilities to completely eliminate the sulphate salt cake by electrolysis.

U.S. Pat. No. 4,129,484 reveals the possibility to electrolyse the chlorine dioxide reaction liquor in a membrane cell where sodium ions are transported across a cation selective membrane while the reactor solution is acidified in the anode compartment and sodium hydroxide is produced in the cathode compartment. Similar processes have recently been described, see U.S. Pat. No. 5,122,240.

In a another approach presented in U.S. Pat. No. 5,089,095 and WO 91/15613 processes are described where hypochlorous acid is oxidized in an electrochemical membrane cell to chloric acid. Direct electrochemical oxidation involves advanced materials and anodes with high surface area to minimize unwanted side reactions. Also, the use of high surface area electrodes gives large investment and operational costs for catalytic coatings on the anodes.

Other processes have been described where pure sodium chlorate is split to chloric acid or mixtures of chloric acid and sodium chlorate with simultaneous production of sodium hydroxide, WO 92/03374, CA-application 2,037,522, U.S. Pat. No. 4,475,603. Also bipolar membranes have been proposed for this application WO 90/10733.

It is a well known fact, see e.g. Jorissen and Simmrock in J. of Applied Electrochemistry 21 (1991) 869–76 and EP 0 532 188 A2, that the current efficiency for caustic production in membrane cells is strongly affected by the concentration of free protons in the anolyte. As the proton concentration increases, larger fractions of the current is transported by protons instead of sodium ions through the membrane. The result is a strongly decreased current efficiency over the membrane. This effect is more pronounced for solutions containing chloric acid compared with sulphate since the chloric acid is a stronger acid giving higher concentration of free protons. In order to achieve high product concentrations a lot of electrical energy is therefore lost. To achieve a certain production capacity and product concentration, it is necessary to invest in electrolysis equipment that is heavily over sized. This is a major draw back of processes for simultaneous caustic and chloric acid production presented to date since electrodes and membranes represent large investment costs. Another disadvantage of these processes is that it is difficult to achieve high concentrations of sodium hydroxide in the catholyte compared with for example chlor-alkali electrolysis. This is mainly due to the type of cation exchange membranes that are needed when the anolyte is acidic. Caustic concentrations are further restricted when bipolar membranes are being used.

The use of electrodialysis has been described in the literature on numerous occasions, see for example R. W. Baker et al. in Membrane Separation Systems, Noyes Data Corporation, 1991. Electrodialysis is a well established technique for desalination of brackish water for production of potable water and table salt. It has also found applications in effluent water treatment, see e.g. U.S. Pat. No. 4,717,450. Processes involving electrodialysis and production of chloric acid have been applied using bipolar membranes with co-production of caustic and chloric acid, see WO 90/10733 and M. Paleologou et al. in Proceedings from 78th Annual Meeting, Technical Section, CPPA. The use of bipolar membranes is restricted by the possibility to produce strong caustic.

Bipolar membranes also have a limited service life due to delamination of the laminated cation and anion exchange membranes.

THE INVENTION

The present invention relates to a process for producing chloric acid containing solutions, e.g. pure chloric acid or process liquors containing chloric acid, which can be performed in an electrodialysis cell and with high current efficiency. The process can simultaneously, with high current efficiency, be used for the production of caustic, especially of sodium and potassium hydroxide. The process comprises the use of an electrodialysis stack with alternating cation and anion exchange membranes. The stack is fed with a metal chlorate solution in one compartment and an acid or a mixture of acids in another compartment. By applying an electrical current over the cell, metal ions from the chlorate are forced to combine with the anions of the acid(s) to give a metal salt solution. At the same time the chlorate ions combine with the protons from the acid(s) to form chloric acid or a mixture of metal chlorate and chloric acid.

The expression "acid" is used particularly for acids which are not chloric acid.

The invention also comprises a device for carrying out this process comprising an electrodialysis stack of anion and cation exchange (selective) membranes forming between them a number of compartments for the flow through of liquids, said membranes being arranged in a sequence which defines a unit cell of such compartments, said stack optionally forming a row of adjacent such unit cells, an anion electrode being arranged at one end of said stack and a cathode electrode being arranged at the other end of said stack, for passing an electric current between said electrodes through said stack and causing flows of anions and cations resp. from solutions in said compartment through said membranes. The electrodialysis device can be made from conventional parts disclosed e.g. in the publication "Membrane Separation Systems" by R. W. Baker et al, Noyes Data Corporation, 1991 the disclosure of which is included by reference. Preferably the membranes which come into contact with chloric acid or chlorate containing solutions are made from oxidation resistant materials. Examples of suitable anion and cation exchange membranes are those sold under the trade names AMH anion exchange membrane and Nafion (Nafion 324) cation exchange membrane resp.

The chloric acid can e.g. be used on-site for generation of chlorine dioxide e.g. by reacting with an appropriate reducing agent, or it can be used as a merchant chemical for transportation to chlorine dioxide units.

The produced metal salt can be further processed to recover the acid, which can be recycled to the electrodialysis stack, and to produce hydroxide of the metal, especially sodium hydroxide.

An advantage of the present process is that stacks for electrodialysis are much less expensive compared with membrane electrolysers. In electrodialysis, a large number of membranes can be stacked plane parallel to each other and with only one anode and one cathode at each end of the stack. The materials costs are mainly for plastics and membranes. In membrane electrolysers on the other hand, each unit cell has to be ended with a cathode and an anode. Electrodes are usually made of sophisticated metallic materials with catalytic coatings. Hence they are expensive and represent a major cost of most electrochemical processes. In addition, electrodes, especially the anodes, have limited long term stability in strong acid solutions. All these drawbacks are avoided by performing the production of chloric acid in an electrodialysis stack and converting the metal in the chlorate to a salt which separately can be converted to acid and caustic at high current efficiency, low energy consumption, low cost and high electrode and membrane service life. According to an embodiment of the invention caustic of the metal is not produced in the same electrodialysis stack as the chloric acid, but can be produced e.g. in a separate electrochemical process, e.g. a separate electrodialysis stack.

When caustic is not produced in the same electrodialysis stack as the chloric acid, it is possible to operate at a higher current efficiency and at higher caustic strength compared with other electrochemical processes presented up to date.

Another advantage of the invention is that hydrochloric acid can be used as the acid medium to produce chloric acid which can be used to give chlorine dioxide substantially without formation of chlorine. Thus, it is possible to overcome the drawbacks of using hydrochloric acid directly in contact with chlorate. This also means that the salt produced in the electrodialysis stack is a metal chloride which generally is much easier to dispose of compared with for example sodium sulphate. If the salt cannot be sewered, it is also more preferably to process the sodium chloride to acid and caustic in the well known chlor/alkali electrolysis compared with both sulphate splitting and chlorate splitting which are processes with much higher investment and operational costs. However, the present invention does not exclude the use of any acid that gives a reasonable performance of the electrodialysis stack.

The process of this invention can be performed at pressures from subatmospheric to superatmospheric pressures but is preferably performed at essentially atmospheric pressures.

The temperature used in the process can vary from the freezing point to the boiling point of the solutions used but is preferably maintained at about ambient temperature up to 100° C., e.g. from 20° C. and up to 80° C., e.g. up to 60° C.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

Below, preferred embodiments of the invention will be described in detail with reference to FIGS. 1, 2 and 3.

Figure 1:
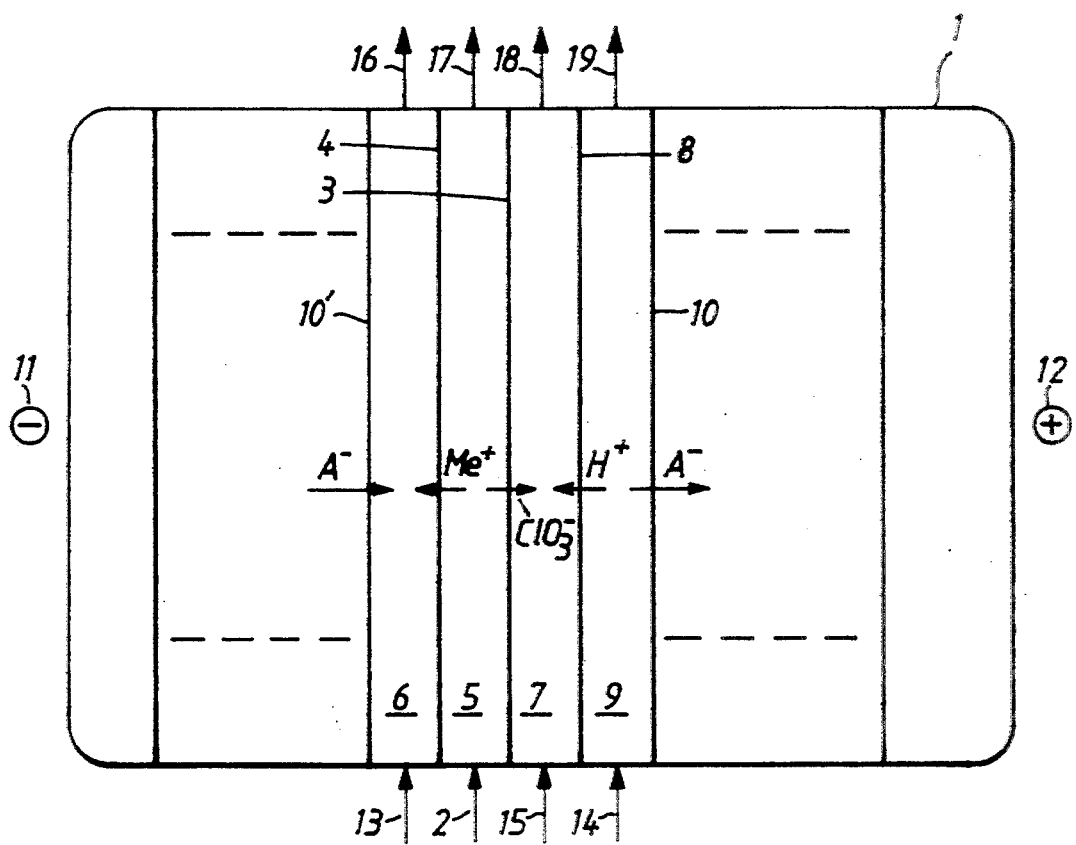
FIG. 1 is a schematic of one embodiment of an electrodialysis stack of the invention.

FIG. 1 shows in a generalized way an electrodialysis stack 1 comprising anion and cation exchange membranes which together form, between adjacent membranes, a number of chambers for the flow of fluids. At least three adjacent such chambers form a unit cell and the stack 1 can be composed of a number of identical such unit cells held together in a row with an anode at one end of said row and a cathode at the other end. As shown on FIG. 1, to an electrodialysis stack 1, a metal chlorate solution 2 is introduced between one anion 3 and one cation 4 exchange membrane, hereafter named the chlorate chamber 5. By applying an electrical current perpendicular to the mebrane surfaces, metal ions are forced to migrate through the cationselective membrane 4 into another compartment 6, hereafter called the salt compartment. The chlorate ions are forced to migrate in the opposite direction from the chlorate compartment, through the anion exchange membrane 3 into a third compartment 7, named the chloric acid compartment. On the other side of the chloric acid compartment 7 is a cation exchange membrane 8 through which protons are forced to migrate from a compartment 9 containing an acid, the acid compartment. The anions in the acid are forced by migration through an anion exchange membrane 10 in to the salt compartment to combine with the metal ions from a chlorate compartment. These four different compartments 5, 6, 7 and 9 are defined as one unit cell which can be repeated to form a stack with numerous unit cells and with one anode 11 and one cathode 12 finishing the stack.

Preferably the electrodialysis process is operated by continuously feeding to the cell a concentrated metal chlorate solution 2, a weak metal salt solution 13, a concentrated acid solution 14 and a dilute chloric acid solution 15, and from the cell withdrawing a concentrated salt solution 16, a depleted metal chlorate solution 17, a fortified chloric acid solution 18 and a depleted acid 19. If it is not important to produce a pure chloric acid, it is preferred to not use the anion exchange membrane 3 between the chlorate and the chloric acid compartment. Instead, a mixture of metal chlorate and chloric acid is introduced between the two cation exchange membranes 4 and 8 while the solution is depleted with respect to metal chlorate and fortified with respect to chloric acid. Thus, the electrodialysis stack consists of unit cells with three compartments and three membranes each. The solution to be acidified can be any chlorate containing solution, for example reactor solutions from chlorine dioxide generators.

The process can further be combined with a process for producing chlorine dioxide. FIG. 2 shows how an electrodialysis stack 1 is combined with a chlorine dioxide generator 20 to which the chloric acid or metal chlorate/chloric acid mixture 22 is fed. The generation of chlorine dioxide can take place by introducing a reducing agent 23 or by catalytic decomposition. The spent reactor solution 24 is preferably recycled to the electrodialysis unit after metal chlorate 25 has been added to the stream. Chlorine dioxide 26 leaving the chlorine dioxide generator can be used as such e.g. in a bleachery or absorbed in water according to already well known processes.

Figure 2:
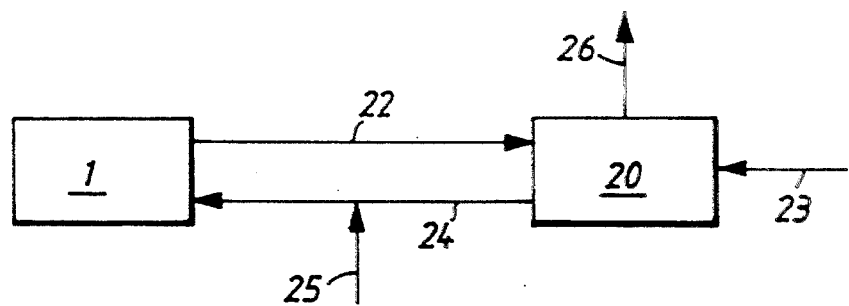
FIG. 2 is a schematic illustrating the combination of the electrodialysis stack of FIG. 1 with a process for producing chlorine dioxide.

It is preferred to use all of the chloric acid produced in the electrodialysis stack 1 for generation of chlorine dioxide in the generator 20 on FIG. 2.

The produced chloric acid can also be concentrated e.g. to decrease the water load on the chlorine dioxide generator and to increase the acidity before it is used in production of chloric acid.

The salt produced in the electrodialysis stack can be disposed of if it is environmentally acceptable. However, it is preferred to convert the salt to new acid which can be recycled back to the stack, and a caustic which can be used e.g. in a pulping process, e.g. sodium or potassium hydroxide.

A preferred route for the conversion of salt to acid and caustic is by splitting the salt in a membrane electrolyser. This can be done in a two compartment cell with a cation selective membrane separating the anode and the cathode compartment. The metal salt is introduced to the anode compartment where protons are produced at the anode at the same time as metal ions are passed by the electrical current through the membrane to combine with hydroxide ions produced at the cathode. It is preferable to use salts of weak organic acids which can be converted to acid and caustic with high current efficiency, for example inorganic salts of acids which are fairly weak. Salts of weak organic acids, e.g. formic acid, acetic acid and propionic acid, can also be used. It is also possible to split the salt in three compartment cells with at least one anion and one cation exchange membrane.

However, it is preferable that the acid used in an electrodialysis stack in which a chloric acid or chlorate containing solution is present in a compartment adjacent to the compartment containing said acid, does not have an anion that can act as a reducing agent in contact with the chloric acid or the acidified chlorate solution. A membrane leakage could otherwise be devastating due to the risk of formation of chlorine dioxide in the stack.

Therefore, when using an acid with anions that can reduce chlorate in the electrodialysis stack, it is preferred to use a secondary system with an inert acid and salt as a medium for transferring protons to the chlorate solution. Such a system can be a second electrodialysis stack which is used to transfer the acid with reducing anions to an acid with inert anions.

For example, hydrochloric acid is not suitable as acid medium in an electrodialysis stack with chlorate on the other side of the membrane. Therefore, it is preferred to convert hydrochloric acid and metal salt with an inert anion, e.g. a metal sulphate in a second electrodialysis stack to an inert acid, e.g. sulphuric acid, and metal chloride.

Figure 3:
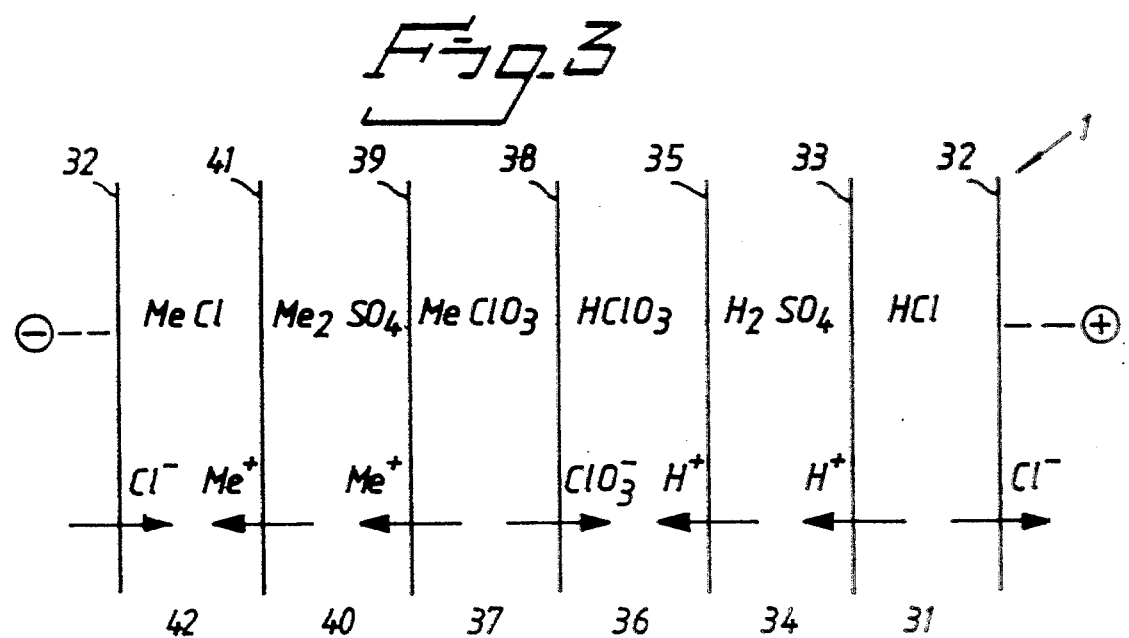
FIG. 3 is a schematic illustrating compartments in the electrolytic stack of FIG. 1.

Another preferred way to use hydrochloric acid as the acid medium is to have at least one, optionally two more compartments in the unit cells of the electrodialysis stack, as outlined in FIG. 3. The stack consists of unit cells with at least five, optionally six compartments made up by four cation exchange membranes and two anion exchange membranes. The hydrochloric acid compartment 31 is depleted when chloride ions pass through an anion exchange membrane 32 and hydrogen ions through a cation exchange membrane 33 to a sulfuric acid compartent that acts as a buffering compartment. The hydrogen ions are passed through the next cation exchange membrane 35 to combine in a chloric acid compartment 36 with chlorate ions coming from the chlorate compartment 37 through the anion exchange membrane 38. The metal ions leave the chlorate compartment through a cation exchange membrane 39 and pass through a metal sulphate compartment 40 that acts as a second buffering compartment. The metal ions pass through the last cation exchange membrane 41 to combine in the salt compartment 42. In the same way as mentioned above it is possible to exclude one anion exchange membrane 38 to produce a mixture of chloric acid and metal chlorate. Alternatively, if the metal chlorate in 37 is neutral, it is possible to exclude the sulphate buffering compartment 40 and the cation exchange membrane 41.

Figure 4:
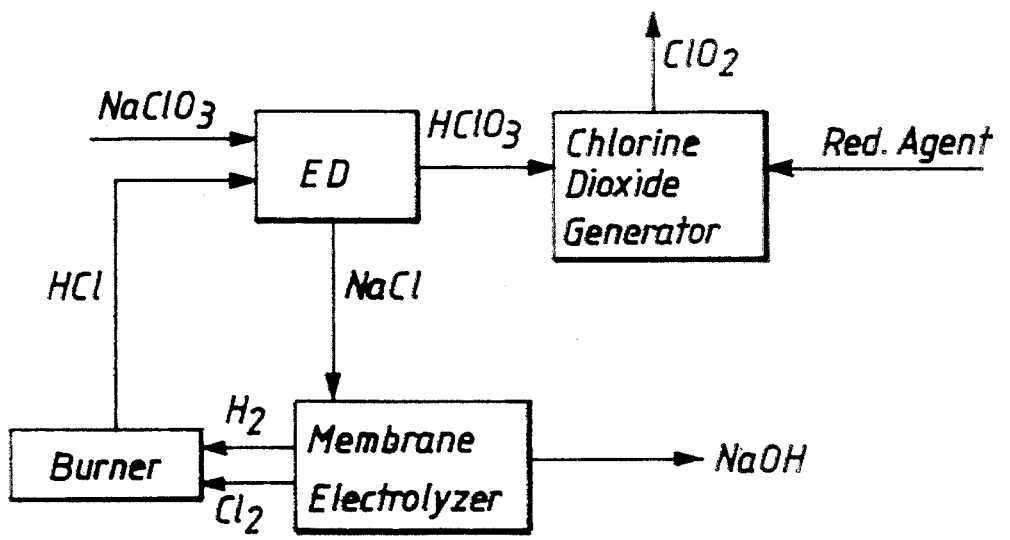
FIG. 4 is a flow diagram of an integrated process for producing chloric acid and alkali.

When hydrochloric acid is used as the acid, and the produced salt solution is a metal chloride, it is preferred to process the metal chloride in a chlorine/alkali electrolyser to produce caustic, chlorine gas and hydrogen gas. The chlorine and the hydrogen can then be combined to hydrochloric acid which can be recycled to the electrodialysis process. The chlorine/alkali process is a well known and cost effective way to make caustics, especially sodium or potassium hydroxide. A flow sheet of such an embodiment is shown on FIG. 4.

Figure 5:
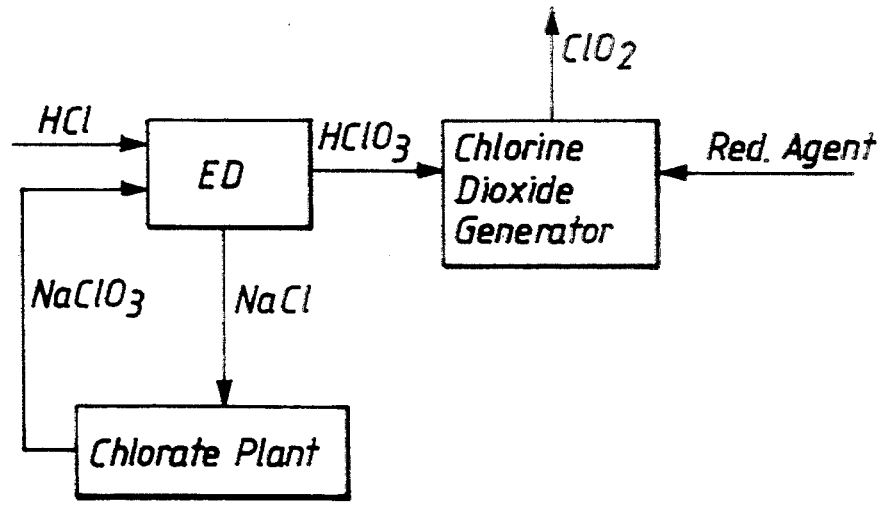
FIG. 5 is a flow diagram of an integrated process for producing chloric acid and sodium chlorate.

Another preferred way to recover the value of the produced metal chloride solution is to use it as feed stock in chlorate electrolysis. Sodium chloride would then be exchanged for hydrochloric acid as the consumed chemical. The metal ions will only circulate between the chlorate plant and the electrodialysis stack. A flow sheet of such an embodiment is shown on FIG. 5.

The preferred embodiments presented above are not restricted by the salts or acids given as examples.

It is, however, usually preferred that the metal is an alkali metal, most preferably sodium or potassium.

The metal chlorate solution fed to the electrodialysis stack should preferably have a high concentration to give a high conductivity and low resistivity in the electrodialysis stack. Preferably the concentration is 0.1 moles/liter up to saturation, more preferably from 1 moles/liter up to saturation.

It is preferable to have a high concentration of the acid fed to the electrodialysis stack to ensure high conductivity and low energy consumption. Preferably the concentration of protons is above 0.1 moles/liter and more preferably above 1 moles/liter. The upper limit of acid concentration depends on the acid used and is governed by conductivity and viscosity. The chloric acid concentration should be high enough to ensure good reaction kinetics for chlorine dioixde formation. However, too high acidity can cause a drop in the current efficiency and should therefore be avoided. Preferred acidity of the chloric acid is above 0.1 normal but below the stability limit of chloric acid. More preferred acidities are from about 0.5 up to about 5 normal, and most preferred from about 1.5 up to about 3.0 normal.

The produced salt solution should preferably have a high concentration to give high conductivity and also to ensure an effective conversion of the salt to acid and caustic.

High electrolyte concentrations and high conductivities make it possible to perform the production at fairly high current densities. This is an important factor since high current efficiency results in higher production capacity per unit area of membrane and consequently in a better economy of the process. Preferred current densities are from 0.1 up to 10 kA/m$^2$, more preferably from 0.5 up to 5 kA/m$^2$ and most preferably from 1 up to 3 kA/m$^2$.

It is possible to use one or more electrodialysis devices with membrane stacks and unit cells in the process for producing chloric acid. The devices and the unit cells therein can be connected in series and/or in parallel as regards the electric current and/or the flow of the various liquid streams, e.g. so that highly concentrated streams with high conductivity are treated in one device and low concentrated or depleated streams with low conductivity are treated in an other device, etc.

The devices and stacks may comprise a series of flat membranes held together in a suitable way, but also other shapes of the membranes and stacks can be used such as membranes with curved surfaces, e.g. stacks in the shape of cylinders etc.

In the following, the invention will be explained with reference to examples. However, the invention is not in any respect restricted or limited by the results or details given in the examples. The solutions used in the examples are aqueous solutions.

EXAMPLE 1

A chloric acid solution was produced in an electrodialysis cell essentially of the type outlined in FIG. 1 with a projected membrane area of 1 dm$^2$ per membrane by continuously pumping electrolytes through the cell compartments with a flow rate of 200 l/h. The acid was 100 g/l of sulfuric acid and the metal chlorate stream was a solution of 400 g/l of sodium chlorate. The chloric acid was produced by applying an electrical current over the cell to move protons from the sulphuric acid through a cation exchange membrane to the chloric acid compartment. Chlorate was transported to the chloric acid compartment from the sodium chlorate solution via an anion exchange membrane. The current density was kept constant at 1.5 kA/m$^2$ during the production period. The current efficiency for the generation of chloric acid was measured at different concentrations of chloric acid in the chloric acid chamber. The following results were obtained:

| Chloric acid M | Current efficiency % |
| --- | --- |
| 0,56 | 78 |
| 1,1 | 79 |
| 1,4 | 74 |
| 2,0 | 57 |
| 2,2 | 62 |

EXAMPLE 2

A mixture of sodium chlorate and chloric acid was produced in an electrodialysis cell essentially of the type outlined in FIG. 1 by ion exchanging the sodium between two cation exchange membranes. Protons were supplied from sulphuric acid on one side of a cation exchange membrane and sodium removed from the chloric acid/sodium chlorate compartment over the second cation exchange membrane. The acid was 20.2 g/liter of sulfuric acid. The test was started with a solution of 195 g/liter of sodium chlorate circulating over the chlorate/chloric acid compartment. The chloric acid concentration was increased by applying a current and measuring chloric acid concentration and current efficiency. The following results were achieved:

| Chloric acid M | Current efficiency % |
| --- | --- |
| 0,40 | 68 |
| 0,56 | 55 |

These results are similar to what is reported for splitting of sodium chlorate, see for example U.S. Pat. No. 4,475,603. However, by applying the present invention, the production of chloric acid can be performed with a lower energy consumption and in a much cheaper cell. Membrane electrolysis involves both expensive electrodes and gives a higher energy consumption since the electrode reactions consume energy.

EXAMPLE 3

20.0 tonnes/day of chlorine dioxide is produced in a chlorine dioxide generator by feeding a chloric acid solution. The chloric acid (25.0 tonnes/day) is continuously produced by converting 31.6 tonnes/day of sodium chlorate with sulphuric acid as the acid medium in an electrodialysis stack. The spent reactor liquor is recycled back to the electrodialysis stack to serve as feed solution to the chloric acid compartment. The produced sodium sulfate salt is transferred to a membrane electrolyser where acid is produced together with 11.9 tonnes/day of sodium hydroxide. The sodium hydroxide is used in the bleachery or in other parts of a pulp mill.

EXAMPLE 4

Chlorine dioxide is produced in same way as described in Example 3 except that the acid medium is hydrochloric acid and that the chloric acid is produced by using an electrodialysis cell with six compartments per unit cell essentially of the type outlined on FIG. 3 and with one buffering compartments containing sulfuric acid (as an inert acid) and the other sodium sulphate. The sodium chloride produced in the electrodialysis stack is transferred to a membrane electrolyser and converted to 10.5 tonnes/day of chlorine, 11.9 tonnes/day of sodium hydroxide and hydrogen. The hydrogen and chlorine is converted to hydrochloric acid by combustion. The hydrochloric acid is then used as the "second acid" in the electrodialysis. The sodium hydroxide is used in the bleachery or in other parts of a pulp mill.

EXAMPLE 5

Chlorine dioxide is produced in same way as described in Example 3 with the exception that the acid medium is hydrochloric acid and that the chloric acid is produced by using an electrodialysis cell with six compartments per unit cell essentially of the type outlined on FIG. 3 and with one buffering compartment containing sulfuric acid and the other sodium sulphate. The sodium chloride produced in the electrodialysis stack is transferred to a chlorate electrolysis unit and converted to 31.6 tonnes/day of sodium chlorate. The produced sodium chlorate is used as feed chemical in the electrodialysis stack.

Below a number of prefered embodiments are mentioned. Said embodiments correspond to the processes and devices defined in the enclosed claims.

Embodiment 1 comprises a process for producing chloric acid wherein a chloric acid containing solution is produced by introducing a metal chlorate solution and an acid into separate compartments of an electrodialysis cell to produce a chloric acid solution or an acidified metal chlorate solution and a solution of metal salt of the introduced acid in two separate electrodialyser cell compartments.

Embodiment 2 comprises a process according to embodiment 1 above, wherein the chloric acid is produced in a number of electrodialysis unit cells arranged in a row and formed by a stack of anion selective and cation selective membranes, each of said unit cells comprising compartments which are arranged for the flow-through of liquids and are separated by walls comprising said cation selective and anion selective membranes, and means for passing an electric current from an anode to a cathode through said membranes and liquids in said compartments for achieving electrodialysis of the contents in said compartments by the migration of ions from said liquids through said membranes, said process comprising introducing into a metal chlorate compartment in each of a number of unit cells in said stack a metal chlorate solution and introducing into an acid compartment in said unit cells an acid solution, and bringing by said electric current metal ions to migrate from said metal chlorate solution through a cation selective membrane wall of said metal chlorate compartment into an adjacent metal salt compartment, and simultaneously bringing protons from said acid to migrate through a cation permeable membrane wall of said acid compartment into a compartment of said unit cells, which can be the metal chlorate compartment or of a separate chloric acid compartment, which is separated from the metal chlorate compartment by an anion selective membrane, through which chlorate ions are brought to migrate into the chloric acid compartment, and withdrawing from said unit cells a solution containing the formed chloric acid, optionally as an acidified metal chlorate solution.

Embodiment 3 comprises a process according to embodiment 1 or 2 above, wherein metal ions from the metal chlorate compartment are brought to migrate to a metal salt compartment in the unit cell, into which anions from an acid compartment of an adjacent unit cell in said stack are brought to migrate, and withdrawing from said compartment the formed metal salt solution, optionally for further use.

Embodiment 4 comprises a process according to embodiment 1, 2 or 3 above, wherein the production of chloric acid is performed in unit cells comprising at least three compartments, wherein the metal chlorate compartment is delimited on the side towards the cathode by a cation selctive membrane from a metal salt compartment, into which metal ions are brought to migrate through said membrane from the metal chlorate compartment, and on the side towards the anode is delimited by a further cation selective membrane from the acid compartment, from which protons are brought to migrate to substitute metal ions in the metal chlorate solution, forming a chloric acid containing solution, which is withdrawn from the cell, optionally as an acidified metal chlorate solution.

Embodiment 5 comprises a process according to any of embodiments 1, 2 or 3 above, wherein production of chloric acid is performed in unit cells comprising at least four compartments, wherein the metal chlorate compartment is delimited on the side towards the cathode by a cation selective membrane from a metal salt compartment, into which metal ions are brought to migrate through said membrane from the metal chlorate compartment, and is delimited on the side towards the anode from a chloric acid compartment by an anion selective membrane, through which chlorate ions are brought to migrate from the metal chlorate compartment into the chloric acid compartment, the chloric acid compartment being delimited towards the cathode by a cation selective membrane, through which protons are brought to migrate from the acid compartment into the chloric acid compartment, forming a chloric acid containing solution, which is withdrawn from the cell.

Embodiment 6 comprises a process according to any of embodiments 1, 2, 3, 4 or 5 above, wherein the production of chloric acid is performed in unit cells in which the acid compartment is on the side towards the anode delimited by a further cation selective membrane from a second acid compartment, from which protons are brought to migrate through said membrane to the first mentioneed acid compartment and from said compartment to the chloric acid or metal chlorate compartment, especially when supplying to said second acid compartment an acid which is reactive in relation to chlorate ions.

Embodiment 7 comprises a process according to any of embodiments 2, 3, 4, 5 or 6 above wherein production of chloric acid is performed in unit cells in which the metal salt compartment is on the side towards the cathode delimited by a further cation selective membrane from a second metal salt compartment, to which metal ions are brought to migrate through said membrane and through said first mentioned metal salt compartment from the metal chlorate compartment, especially when maintaining in said second metal salt compartment an anion which is reactive with chlorate ions.

Embodiment 8 comprises a process according to any of the preceding embodiments wherein the process is performed in unit cells in which the acid compartment or the second acid compartment resp. is on the side towards the anode delimited by an anion selective membrane and the metal salt compartment or the second metal salt compartment resp. is on the side towards the cathode delimited by an anion selective membrane, both of said membranes also forming the wall of a compartment of adjacent unit cells, especially wherein the anion selective membrane which forms the side delimiting the acid compartment or second acid compartment resp. of a first unit cell towards the anode, simultaneously forms the membrane which delimits the metal salt compartment or second metal salt compartment resp. of an adjacent unit cell in said stack towards the cathode.

Embodiment 9 comprises a process according to any of the preceding embodiments wherein the formed metal salt is removed from the electrodialyser and converted to acid, which is completely or partially recycled to the electrodialysis cells for production of chloric acid or an acidified metal chlorate solution, said conversion comprising e.g. electrochemical splitting in a membrane cell to produce the acid and a metal hydroxide or introducing the metal salt and a second acid to separate compartments of unit cells of a second electrodialyser, preferably of the same construction type as the metal chlorate electrodialyser with unit cells formed by a stack of cation and anion selective membranes, to produce an acid of the introduced metal salt anions and a solution of metal salt of the introduced second acid in two separate compartments of said second electrodialyser cells.

Embodiment 10 comprises a process according to any of the preceding embodiments 1–9 wherein the acid is sulfuric acid, phosphoric acid, hydrochloric acid or an organic acid, especially formic acid, acetic acid or propionic acid, and mixtures containing one or more of said acids, and that the metal salt is the metal salt of the anion which corresponds to the acid or acids used, and wherein acids or salts with an anion which is reactive, e.g. reducing in relation to chlorate ions, especially hydrochloric acid and metal chlorides, are preferably introduced in a compartment in the unit cells which is separated by at least one other compartment containing an acid or a metal salt which is inert in relation to chlorate ions, especially sulphuric or phosphoric acid and metal sulphate and phosphate resp., from compartments containing chlorate ions, or introduced into the second electrodialyzer and converted to an inert acid which is used in the metal chlorate electrodialyser cells.

Embodiment 11 comprises a process according to embodiment 10 above, wherein the formed metal chloride is used in the production of chlorine, hydrogen and metal hydroxide, the chlorine and hydrogen preferably being reacted to form hydrochloric acid which optionally is recycled to the second electrodialysis cells.

Embodiment 12 comprises a process according to any of the preceding embodiments wherein the metal is an alkali metal, especially sodium or potassium.

Embodiment 13 comprises a process for producing chlorine dioxide wherein at least part of the acid or chlorate fed to the chlorine dioxide reaction device is chloric acid or a mixture of chloric acid and metal chlorate produced by a process according to any of the preceding embodiments.

Embodiment 14 comprises a process according to any of the preceding embodiments wherein the metal chlorate solution fed to the electrodialysis cells is a reactor liquor from a chlorine dioxide reactor.

Embodiment 15 comprises a device for carrying out the process according to any of the preceding embodiments which device comprises an electrodialysis stack (1) (the figures in bracket refer to the numerals used in the drawings) of anion selective and cation selective membranes delimiting between them a number of compartments for the through-flow of liquids, said membranes being arranged in a sequence which defines a number of unit cells of each compartments, an anode (12) arranged at one end of said stack and a cathode (11) arranged at the other end of the stack for passing an electric current between said electrodes through said stack and causing the flow of anions and cations resp. from said solutions in said compartments through said membranes.

Embodiment 16 comprises a device according to embodiment 15 in which the unit cells comprise three, or at least three, compartments delimited by, counted from the cathode side, an anion selective membrane (10) and two cation selective membranes (8,4), the next membrane in said sequence optionally being a further anion selective membrane (10'), which can also be the first membrane in a sequence of membranes forming an adjacent unit cell; or four, or at least four, compartments obtainable by including a further anion selective membrane (3) between the two cation selective membranes (4,8) in the three compartment embodiment of the unit cell, especially for forming a chloric acid compartment (7); or at least five compartments obtainable by including a further cation selective membrane between the cation selective membrane (8) and the anion selective membrane (10) of the acid compartment, especially for forming a further (second) acid compartment (31), or a further cation selective membrane on the cathode side of the cation selective membrane (4) which delimits the metal chlorate compartment in the four compartment embodiment of the unit cell, especially for forming a further metal salt compartment (42); or at least 6 compartments obtainable by including both the cation selective membranes mentioned in the five compartment embodiment, especially for forming a further acid and a further metal salt compartment.

We claim:

1. A process for producing chloric acid, wherein a chloric acid-containing solution is produced by introducing a metal chlorate solution and an acid other than chloric acid into separate compartments of an electrodialysis cell to produce a chloric acid solution or an acidified metal chlorate solution and a solution of metal salt of the introduced acid in two separate electrodialyzer cell compartments.

2. A process according to claim 1, wherein the chloric acid is produced in a number of electrodialysis unit cells arranged in a row and formed by a stack of anion selective and cation selective membranes, each of said unit cells comprising compartments which are arranged for the flow-through of liquids an are separated by walls comprising said cation selective and anion selective membranes, and means for passing an electric current from an anode to a cathode through said membranes and liquids in said compartments for achieving electrodialysis of the contents in said compartments by the migration of ions from said liquids through said membranes, said process comprising introducing into a metal chlorate compartment in each of a number of unit cells in said stack a metal chlorate solution and introducing into an acid compartment in said unit cells an acid solution, and bringing by said electric current metal ions to migrate from said metal chlorate solution through a cation selective membrane wall of said metal chlorate compartment into an adjacent metal salt compartment, and simultaneously bringing protons from said acid to migrate through a cation permeable membrane wall of said acid compartment into a compartment of said unit cells, which can be the metal chlorate compartment of of a separate chloric acid compartment, which is separated from the metal chlorate compartment by an anion selective membrane, through which chlorate ions are brought to migrate into the chloric acid compartment, and withdrawing from said unit cells a solution containing the formed chloric acid, optionally as an acidified metal chlorate solution.

3. A process according to claim 1, wherein metal ions from the metal chlorate compartment are brought to migrate to a metal salt compartment in the unit cell, into which anions from an acid compartment of an adjacent unit cell in said stack are brought to migrate, and withdrawing from said compartment the formed metal salt solution, optionally for further use.

4. A process according to claim 1, wherein the production of chloric acid is performed in unit cells comprising at least three compartments, wherein the metal chlorate compartment is delimited on the side towards the cathode by a cation selective membrane from a metal salt compartment, into which metal ions are brought to migrate through said membrane from the metal chlorate compartment, and on the side towards the anode is delimited by a further cation selective membrane from the acid compartment, from which protons are brought to migrate to substitute metal ions in the metal chlorate solution, forming a chloric acid-containing solution, which is withdrawn from the cell optionally as an acidified metal chlorate solution.

5. A process according to claim 1, wherein production of chloric acid is performed in unit cells comprising at least four compartments, wherein the metal chlorate compartment is delimited on the side towards the cathode by a cation selective membrane from a metal salt compartment, into which metal ions are brought to migrate through said membrane from the metal chlorate compartment, and is delimited on the side towards the anode from the chloric acid compartment by an anion selective membrane, through which chlorate ions are brought to migrate from the metal chlorate compartment into the chloric acid compartment, the chloric acid compartment being delimited towards the anode by a cation selective membrane, through which protons are brought to migrate from the acid compartment into the chloric acid compartment, forming a chloric acid-containing solution, which is withdrawn from the cell.

6. A process according to claim 1, wherein the production of chloric acid is performed in unit cells in which the acid compartment is on the side toward the anode delimited by a further cation selective membrane from a second acid compartment, from which protons are brought to migrate through said membrane to the first mentioned acid compartment and from said compartment to the chloric acid or metal chlorate compartment, when supplying to said second acid compartment an acid which is reactive in relation to chlorate ions.

7. A process according to claim 1, wherein production of chloric acid is performed in unit cells in which the metal salt compartment is on the side towards the cathode delimited by a further cation selective membrane from a second metal salt compartment, to which metal ions are brought to migrate through said membrane and through said first mentioned metal salt compartment from the metal chlorate compartment, when maintaining in said second metal salt compartment an anion which is reactive with chlorate ions.

8. A process according to claim 1, wherein the process is performed in unit cells in which the acid compartment or the second acid compartment respectively is on the side towards the anode delimited by an anion selective membrane and the metal salt compartment or the second metal salt compartment respectively is on the side towards the cathode delimited by an anion selective membrane, both of said membranes also forming the wall of a compartment of adjacent unit cells, wherein the anion selective membrane which forms the side delimiting the acid compartment or second acid compartment respectively of a first unit cell towards the anode, simultaneously forms the membrane which delimits the metal salt compartment or second metal salt compartment respectively of an adjacent unit cell in said stack towards the cathode.

9. A process according to claim 1, wherein said electrodialyzer comprises a first electrodialyzer, and wherein the formed metal salt is removed from said first electrodialyzer and converted to acid, which is completely or partially recycled to the electrodialysis cells of the first electrodialyzer for production of chloric acid or an acidified metal chlorate solution, said conversion comprising electrochemical splitting in a membrane cell to produce the acid and a metal hydroxide or introducing the metal salt and a second acid to separate compartments of unit cells of a second electrodialyzer to produce an acid of the introduced metal salt anions and a solution of metal salt of the introduced second acid in two separate compartments of said second electrodialyzer cells.

10. A process according to claim 9, wherein the unit cells of the second electrodialyzer has the same construction as the unit cells of the first electrodialyzer.

11. A process according to claim 1, wherein said electrodialyzer comprises a first electrodialyzer wherein the acid is sulfuric acid, phosphoric acid, hydrochloric acid, formic acid, acetic acid or propionic acid, and mixtures containing one or more of said acids, and wherein the metal salt is the metal salt of the anion which corresponds to the acid or acids used, and wherein acids or salts with a reactive anion which is reducing in relation to chlorate ions, are introduced in a compartment in the unit cells which is separated by at least one other compartment containing an acid or a metal salt which is inert in relation to chlorate ions, from compartments containing chlorate ions, or introduced into a second electrodialyzer and converted to an inert acid which is used in the electrodialyzer cells of the first electrodialyzer.

12. A process according to claim 11, wherein the formed metal chloride is used in the production of chlorine, hydrogen and metal hydroxide, the chlorine and hydrogen being reacted to form hydrochloric acid.

13. A process according to claim 12, wherein the formed hydrochloric acid is recycled to the cells of the second electrodialyzer.

14. A process according to claim 11, wherein the metal chloride formed in the electrodialysis is used for producing metal chlorate.

15. A process according to claim 1, wherein the metal is an alkali metal.

16. A process for producing chlorine dioxide wherein at least part of the acid or chlorate fed to the chlorine dioxide reaction device is chloric acid or a mixture of chloric acid and metal chlorate produced by the process according to claim 1.

17. A process according to claim 1, wherein the metal chlorate solution fed to the electrodialysis cells is a reactor liquor from a chlorine dioxide reactor.

* * * * *